United States Patent
Chandrasekaran

(10) Patent No.: US 10,652,246 B2
(45) Date of Patent: May 12, 2020

(54) SECURITY DESCRIPTORS FOR RECORD ACCESS QUERIES

(71) Applicant: salesforce.com, inc., San Francisco, CA (US)

(72) Inventor: Venkat Chandrasekaran, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 696 days.

(21) Appl. No.: 15/396,185

(22) Filed: Dec. 30, 2016

(65) Prior Publication Data

US 2017/0111363 A1  Apr. 20, 2017

Related U.S. Application Data

(63) Continuation of application No. 14/507,728, filed on Oct. 6, 2014, now Pat. No. 9,547,689.

(60) Provisional application No. 61/895,238, filed on Oct. 24, 2013.

(51) Int. Cl.

| | | |
|---|---|---|
| *H04N 7/16* | (2011.01) | |
| *G06F 7/04* | (2006.01) | |
| *H04L 29/06* | (2006.01) | |
| *G06F 16/245* | (2019.01) | |
| *G06F 16/28* | (2019.01) | |
| *G06F 16/951* | (2019.01) | |
| *G06F 16/22* | (2019.01) | |
| *G06F 16/2455* | (2019.01) | |

(Continued)

(52) U.S. Cl.
CPC ........ *H04L 63/101* (2013.01); *G06F 16/2282* (2019.01); *G06F 16/245* (2019.01); *G06F 16/24552* (2019.01); *G06F 16/24575* (2019.01); *G06F 16/284* (2019.01); *G06F 16/951* (2019.01); *G06F 21/6227* (2013.01)

(58) Field of Classification Search
CPC ....................................................... G06F 21/62
USPC .............................................................. 726/27
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| | (Continued) | |

OTHER PUBLICATIONS

Abhishek Nagar; Securing Fingerprint Template: Fuzzy Vault with Minutiae Descriptors; IEEE; pp. 1-4 (Year: 2008).*

(Continued)

*Primary Examiner* — Monjur Rahim
(74) *Attorney, Agent, or Firm* — Jaffery, Watson, Mendonsa & Hamilton, LLP

(57) ABSTRACT

Embodiments regard security descriptors for record access queries. An embodiment of a method includes: receiving a record access query, the query regarding records for a certain one or more users at a certain access level; searching one or more sharing tables of entities in a computing environment for security descriptors, each security descriptor being associated with a set of one or more users having access to one or more records of a set of records at an access level; identifying any security descriptors in the one or more sharing tables that relate to the certain one or more users with at least the certain access level; and searching the one or more records associated with each of the identified security descriptors according to the record access query.

26 Claims, 9 Drawing Sheets

(51) Int. Cl.
*G06F 16/2457* (2019.01)
*G06F 21/62* (2013.01)

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,874,013 B2 * | 1/2011 | Kaminaga ............... G06F 21/62 726/28 |
| 8,352,483 B1 * | 1/2013 | Ramesh ............... G06F 16/41 707/758 |
| 9,392,047 B1 | 7/2016 | Santana et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0125461 A1 | 6/2005 | Filz |
| 2006/0136361 A1 * | 6/2006 | Peri ............... G06F 21/6227 |
| 2007/0174285 A1 * | 7/2007 | Dutta ............... G06F 21/6227 |
| 2007/0214129 A1 * | 9/2007 | Ture ............... G06F 16/951 |
| 2007/0255698 A1 * | 11/2007 | Kaminaga ............... G06F 21/62 |
| 2010/0058002 A1 * | 3/2010 | Voll ............... G06F 3/0608 711/154 |
| 2010/0121821 A1 | 5/2010 | Kinoshita et al. |
| 2010/0312785 A1 * | 12/2010 | Kliewe ............ G06F 16/90335 707/769 |
| 2012/0167121 A1 | 6/2012 | Reierson et al. |
| 2012/0233523 A1 * | 9/2012 | Krishnamoorthy ............... G06F 11/1068 714/758 |
| 2012/0317129 A1 * | 12/2012 | Qayyum ............ G06F 21/6227 707/754 |
| 2013/0019314 A1 | 1/2013 | Ji et al. |
| 2014/0101129 A1 * | 4/2014 | Branish, II ............ G06F 16/972 707/714 |
| 2015/0161147 A1 * | 6/2015 | Zhao ............... G06F 16/438 707/772 |

OTHER PUBLICATIONS

Non-Final Office Action for U.S. Appl. No. 14/507,728 dated Dec. 18, 2015, 15 pages.
Final Office Action from U.S. Appl. No. 14/507,728 dated May 3, 2016, 12 pgs.

(56) References Cited

OTHER PUBLICATIONS

Notice of Allowance for U.S. Appl. No. 14/507,728 dated Sep. 7, 2016, 7 pgs.

* cited by examiner

Entity Share Table
200

| User Set 1 | Record 1 | Access FA |
|---|---|---|
| User Set 2 | Record 2 | Access RW |
| User Set 3 | Record 3 | Access RW |
| User Set 3 | Record 4 | Access RW |
| User Set 4 | Record 3 | Access RO |
| User Set 4 | Record 4 | Access RO |
| ... | ... | ... |
| User Set *n* | Record *m* | Access *x* |

User Set = set of users, groups, or both

Figure 2

Entity Share Table
300

| | | | |
|---|---|---|---|
| SD 1 | User Set 1 | Record Set 1 | Access FA |
| SD 2 | User Set 2 | Record Set 2 | Access RW |
| SD 3 | User Set 3 | Record Set 3 | Access FA |
| SD 4 | User Set 4 | Record Set 3 | Access RO |
| SD 5 | User Set 4 | Record Set 4 | Access RW |
| SD 6 | User Set 5 | Record Set 5 | Access RO |
| ... | ... | ... | ... |
| SD $y$ | User Set $n$ | Record Set $m$ | Access $x$ |

User Set = set of one or more users, groups, or both
Record Set = set of one or more records

Figure 3

SECURITY DESCRIPTORS FOR RECORD ACCESS QUERIES

CROSS REFERENCE TO RELATED APPLICATIONS

This United States patent application is a continuation of U.S. patent application Ser. No. 14/507,728 filed Oct. 6, 2014, entitled "SECURITY DESCRIPTORS FOR RECORD ACCESS QUERIES," by Chandrasekaran, which claims priority to U.S. Provisional Patent Application No. 61/895,238 filed Oct. 24, 2013, entitled "SYSTEM AND METHOD FOR SECURITY DESCRIPTORS FOR RECORD ACCESS QUERIES," the entire contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate to techniques for providing security for records. More particularly, embodiments relate to security descriptors for record access queries.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Complex computing networks in many organizations provide security access to records (which may be also be referred to as files or other similar terms) and associated documents based on sharing rules. The sharing rules may define a highly complex sharing model in a database. People and groups that use the sharing rules each have a share table in which all sharing for the records of that person or group are persisted. The share table is denormalized, in the sense that multiple records having been shared with same set of users with the same access levels are expressed as different rows. For example, after user A shares a file X with user B and user C, user D shares the file X with user B and user C. In this case, there are 4 shares to be tracked: A→B, A→C, D→B, and D→C.

However, this model suffers from significant inefficiency in terms of the selectivity of rows based on access levels. The inability to express sharing rules in a normalized manner when querying for records is problematic. If a user would like to discover all records or associated documents that the user owns or to which the user has access, the query may be based on the union of all records owned by the user, all records that have been shared with the user, all records in private online social network groups of which the user is a member, all records in online social network groups, and all records in libraries of which the user is a member. A query that executes the above logic may, for example, take more than a minute for an organization with a million records, which is unacceptable. Accordingly, it is desirable to provide techniques that enable a system to provide more efficient record queries.

BRIEF DESCRIPTION OF THE DRAWINGS

Embodiments are illustrated by way of example, and not by way of limitation, in the figures of the accompanying drawings in which like reference numerals refer to similar elements.

FIG. 2 is a simplified illustration of an entity share table;

FIG. 3 is a simplified illustration of a sharing table including security descriptors according to an embodiment;

DETAILED DESCRIPTION

Figure 1:
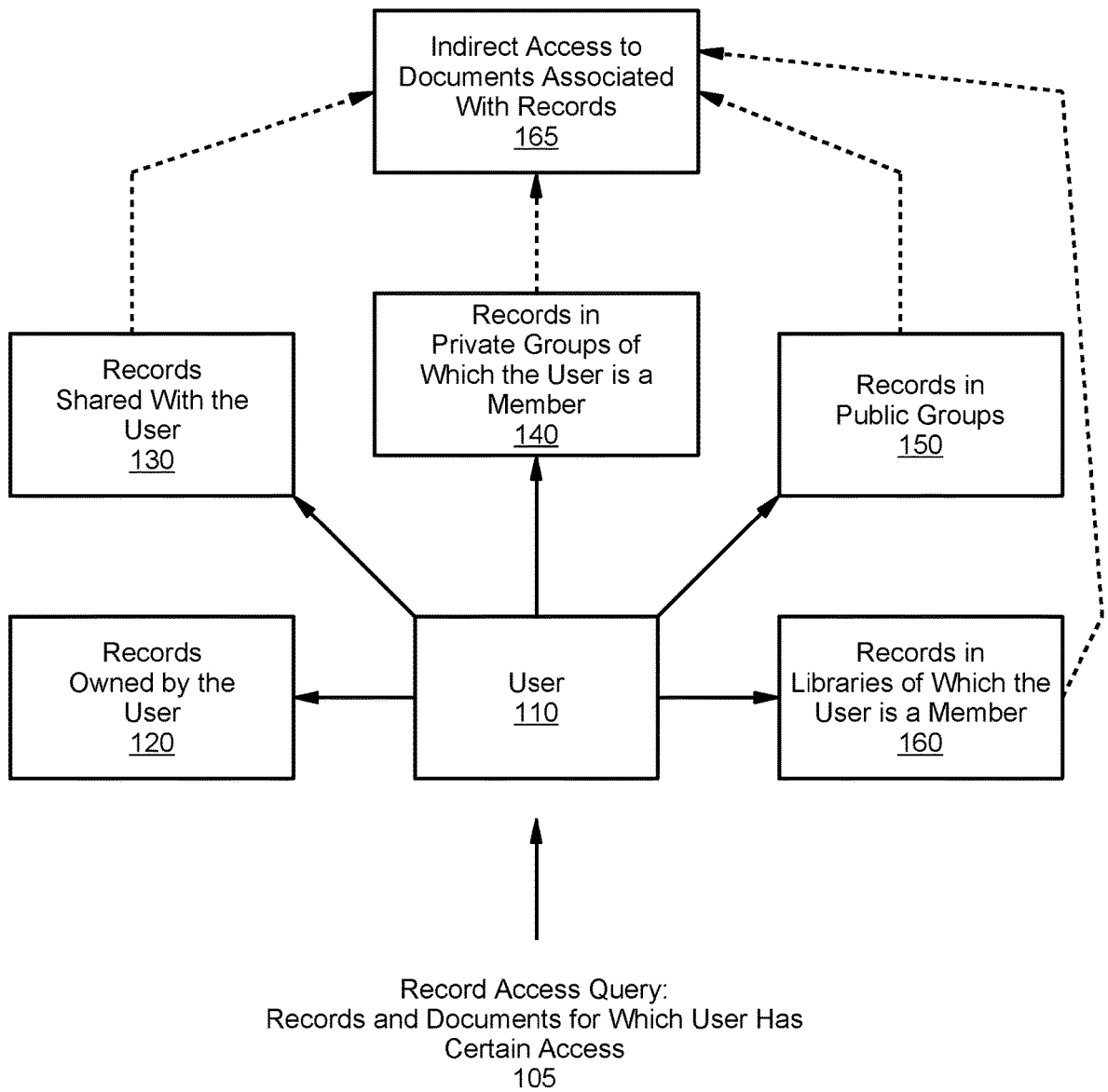
FIG. 1 illustrates a search in response to a record access query.

In the following description, numerous specific details are set forth. However, embodiments may be practiced without these specific details. In other instances, well-known circuits, structures and techniques have not been shown in detail in order not to obscure the understanding of this description.

In some embodiments, security access for records is modeled as security descriptors. In some embodiments, access to records is maintained in security descriptors in entity share tables, and a system may utilize the security descriptors contained in the entity share tables to provide for efficient record searches.

Security of a database may vary across entities and applications, with a main facility for sharing records that may be referred to as "sharing rules". The sharing rules may define a highly complex sharing model in a database for a large organization. For example, a given document or record in a Salesforce® database can be shared with different users, applications, and locations, with each of these applying their own sharing policy and governing rules. The data may include a multi-tenant database. As used herein, a record provides certain information or data regarding a particular item. Stated in another way, a record is a single instance of an object, including, for example, a Salesforce object. A record may include a collection of fields that store information about a specific item of a specific type, such as a contact, an account, or an opportunity. In certain implementations, one or more associated documents or files may be attached to a record. Records may be located in many different locations, where locations include, but are not limited to, libraries, online social network groups, and other locations.

As used herein, a library is a repository or collection of records, including, but not limited to a library in a Salesforce database.

Entities in an environment (such as an environment with an on-demand database service) that use the sharing rules may each have a share table (which may be designated as _SHARE table) in which all sharing for the records of that entity are persisted. The share table may be denormalized in the sense that multiple records having been shared with same set of users with the same access levels are expressed as different rows. However, this conventional model suffers from significant inefficiency in terms of selectivity of rows based on access levels, and there is no clear heuristic that can help efficiently execute queries.

The inability to express sharing rules in a normalized manner when querying for records can be problematic in Files/Content application. As used herein, a record query includes a query that seeks associated documents that may be attached to a record. If a user would like to find out all or how many records or associated documents that the user has access to, a conventional query may be a union of the following:

(a) All records owned by the user;
(b) All records that have been shared with the user;
(c) Records in private groups of which the user is a member;
(d) Records in public groups, whether or not the user is a member; and
(e) Records in libraries of which the user is a member.

FIG. 1 illustrates a search in response to a record access query. As illustrated, a record access query 105 may regard a user 110, where the query may relate to records, which may include associated documents, for which the user has a certain type of access. In this particular example, the query may request a search of all records for which the user 110 has a certain type of access 105, which may include, for example, a particular access level (such as Full Access) or a certain minimum level of access, such as read access (which may include a number of access levels that allow at least Read Only access).

However, a conventional search requires a search of, for example, all records that are owned by the user 120, all records that have been shared with the user 130, all records in private groups of which the user is a member 140, all records in public groups (whether or not the user is a member of the public group) 150, and all records in libraries of which the user is a member 160. Further, there is indirect access to documents associated with such records 165.

In some embodiments, a search in response to the record access query 105 utilizes security descriptor records, wherein such security descriptors provide for improved efficiency and reduced search times.

FIG. 2 is a simplified illustration of an entity share table. In this illustration, each set of users (referred to herein as a user set, including any set of one or more users, groups, or both) for which there has been a share of access to a record by an entity is indicated, together with the access level, in an entity share table 200. In a particular implementation access levels may include: Full Access in which a user can view, edit, delete, and transfer a record (which may include associated documents for the record); Read/Write in which a user can view and view the record, and add associated records, notes, and attachments to the record; Read Only in which a user can read the record and add associated records to it, but cannot edit the record or add notes or attachments; and Private in which the user cannot access the record in any way. In other implementations different access levels may be available.

For example, a User Set 1 (which may include any one or more users or groups) has been provided access to a certain record, Record 1, with a certain access level, Access FA (Full Access) in this example. Similarly, User Set 2 (a second set of one or more users or groups) has access to Record 2 with a certain access RW (Read-Write). However, User Set 3 (a third set of one or more users or groups) has access to Record 3 with RW access, and to Record 4 with access RW. Thus, sharing of multiple records with the same level of access to the same one or more users or groups requires multiple line entries in the share table. Similarly, User set 4 then has access to Record 4 with Access RO (Read Only), as well as access to Record 4 with Read Only access, again requiring multiple line entries in the entity share table 200. This simplified example continues to a User Set n having access with record m with access level x.

As can be seen in FIG. 2, if a large organization has many records and associated documents and many entities, a search of records for which a user has access requires search of a very large number of elements, and thus conventional record searches are generally very time consuming and inefficient.

In some embodiments, a system may utilize security descriptors in the search of records and associated documents, wherein the security descriptors identify each instance in which the access level is the same, thereby simplifying the search of records for a query.

Because many locations (such as libraries, online social network groups, and others) are containers, in which case all of the records in those containers will have the same security inherited, a number of security descriptors in which a given user has a certain access level (such as read access) may be relatively small in comparison with a total number of records. In some embodiments, a security descriptor provides for normalization of the applicable share table.

In some embodiments, each unique set of users, groups, or both (referred to herein as a "user set") that have the same access level to at least one record in a set or group of records are listed in a share table with one security descriptor record. The security descriptor identifier is associated with the corresponding records. In some embodiments, two records with the same set of users, groups, or both (i.e., the same user set) having the same access level are associated with the same security descriptor record in a share table.

In some embodiments, a query can be modified to filter on the security descriptors in which the user has a certain minimum access level, such as read access, irrespective of the number of records with which the security descriptors are associated. This operation produces a single query that spans across all records when all entities use security descriptors for sharing tables.

FIG. 3 is a simplified illustration of an entity sharing table including security descriptors according to an embodiment. In some embodiments, an entity share table 300 is normalized to include security descriptors, each security descriptor defining a set of records (a record set referring to any one or more records) with a common set of users and a common access level.

As illustrated in FIG. 3, Security Descriptor 1 (SD1) defines a User Set 1 including one or more users or groups of user with access to Record Set 1, including one or more records, with a certain access level, Full Access in this example. Continuing in the entity share table 300, Security Descriptor 2 defines User Set 2 and Record Set 2 with Full Access; Security Descriptor 3 defines User Set 3 and Record Set 3 with Full Access; Security Descriptor 4 defines User Set 4 and Record Set 3 with Read Only access (in comparison with SD3, the same records set for two different user sets, but with different access levels, thus utilizing a different security descriptor); Security Descriptor 5 defines User Set 4 and Record Set 4 with Read-Write access (in comparison with SD4, the same user set has been shared access with record set 3 and record set 4, but with different access levels, thus utilizing a different security descriptor); Security Descriptor 6 defines User Set 4 and Record Set 3 with Full Access (in comparison with SD5, the same record set and access level but different user set); and continuing to Security Descriptor y defining User Set n and Record Set m with a certain access level x.

In some embodiments, a search of records may utilize the normalized entity share table 300, where each security descriptor of the share table defines a unique set of a user set of one or more users, groups, or both, a record set, and a particular access level.

Figure 4:
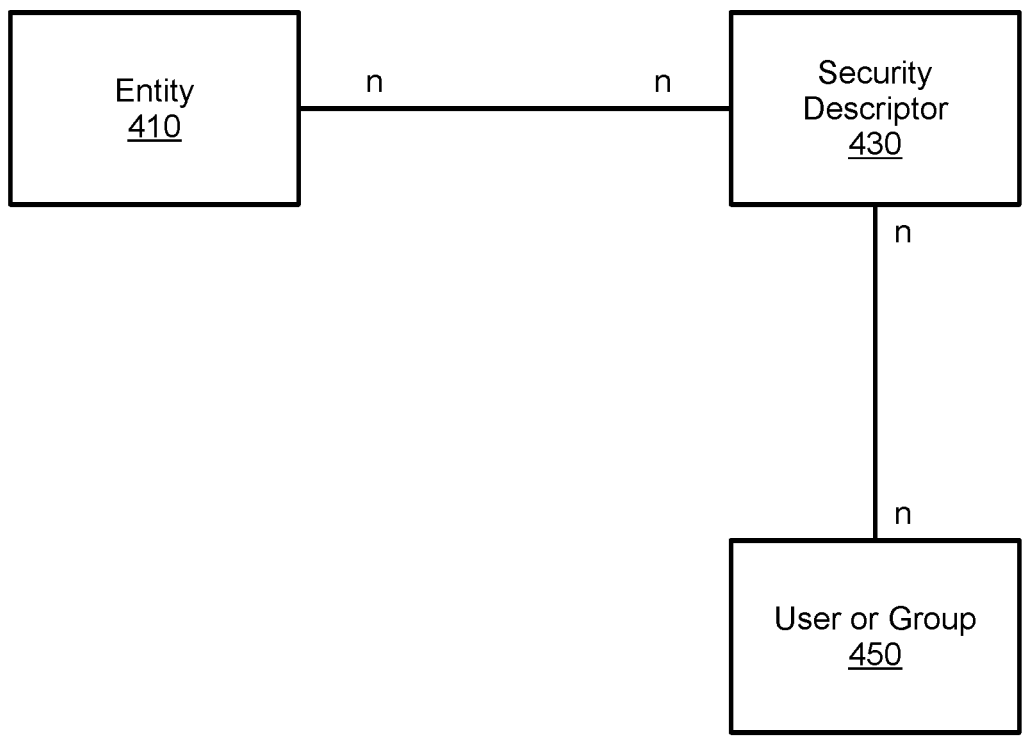
FIG. 4 is an illustration of security descriptor structure according to an embodiment.

FIG. 4 is an illustration of security descriptor structure according to an embodiment. As illustrated each entity 410 of a system that has shared one or more records with a user or group 450 is associated with one or more security descriptors 430.

More specifically, each unique set of users, groups, or both in the entity share table will have one security descriptor record, and the security descriptor identification is associated with the corresponding records. Two records with the same set of users/groups and having the same access level will be associated with the same security descriptor. A unique set means the exact set of users and groups that have the same access level of access to at least one, but possibly more, entities.

Figure 5:
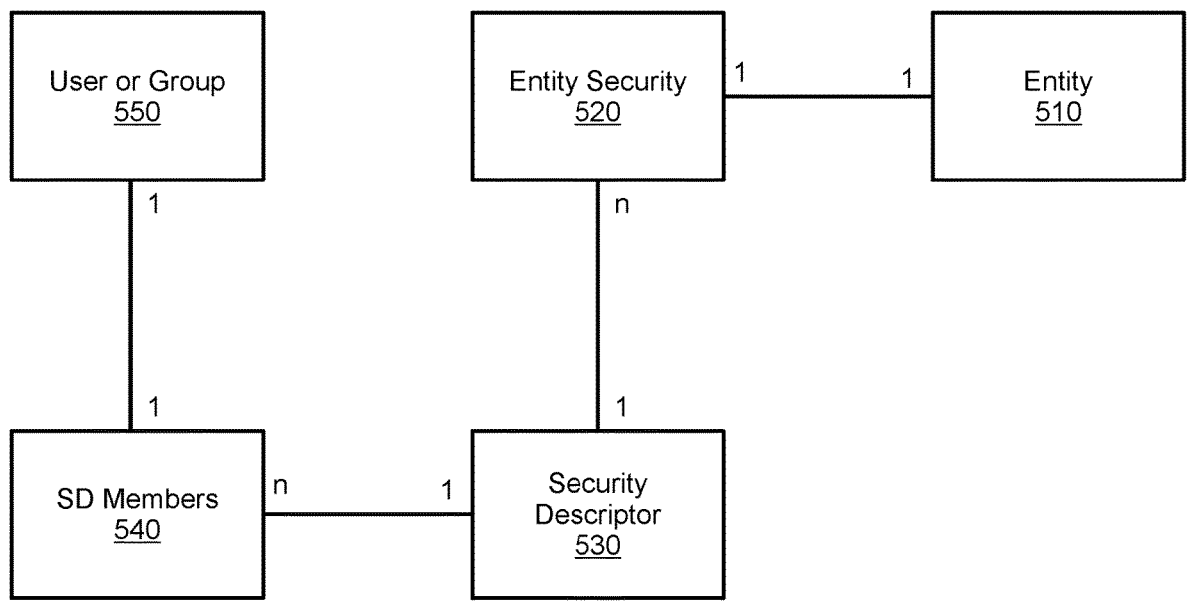
FIG. 5 is an illustration of security descriptor structure according to an embodiment.

FIG. 5 is an illustration of security descriptor structure according to an embodiment. In this illustration, additional details to the elements shown in FIG. 4 are included. In some embodiments, each of one or more entities 510 with entity security 520 may be associated with a security descriptor 530. The security descriptor 530 may be associated with one or more security descriptor members 540, wherein each security descriptor member is a record that has been shared with one or more users, groups, or both 550, with each security descriptor member being associated with at least some of the one or more users, group, or both 550.

Figure 6:
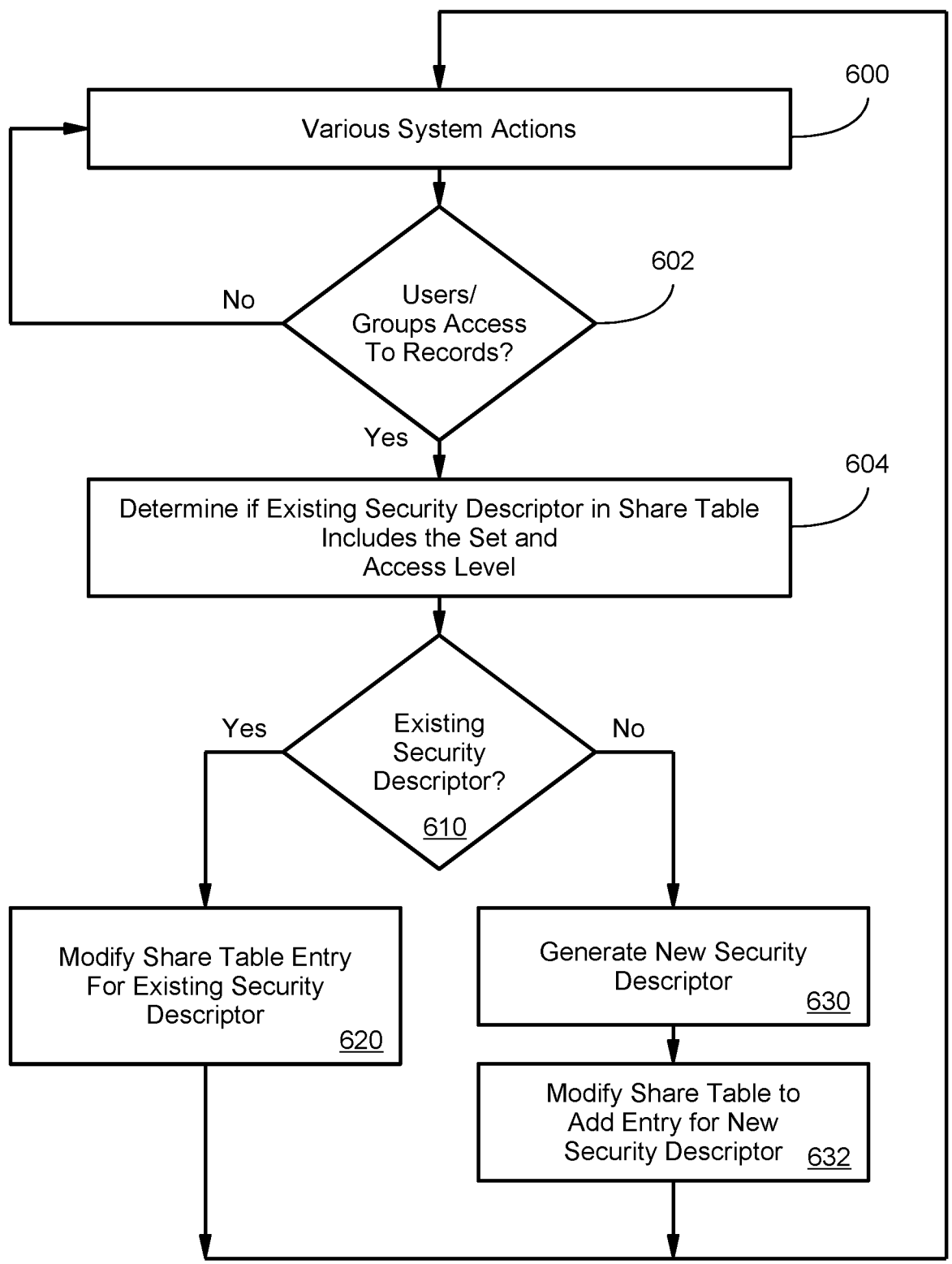
FIG. 6 is a flowchart to illustrate generation of share table entries including security descriptors according to an embodiment.

FIG. 6 is a flowchart to illustrate generation of share table entries including security descriptors according to an embodiment. In some embodiments, if, among various system actions 600 in a system, one or more users, groups, or both are provided access to one or more records at a certain access level by an entity 602, then such sharing information is recorded utilizing security descriptors in an entity sharing table according to sharing rules of the system. In some embodiments, there is a determination whether an existing security descriptor includes the set of one or more users, groups, or both at the certain access level 604.

If there is such an existing security descriptor 610, then the entity share table entry for the existing security descriptor may be modified to include the one or more records 620. Thus, the security descriptor defines a unique set of a user set of one or more users, groups or both, with the resulting record set and the existing access level.

If an existing security descriptor of the entity share table is not associated with the one or more users, groups, or both at the given access level 610, then a new security descriptor is generated 630, and the entity share table is modified to add an entry for the new security descriptor 632.

Figure 7:
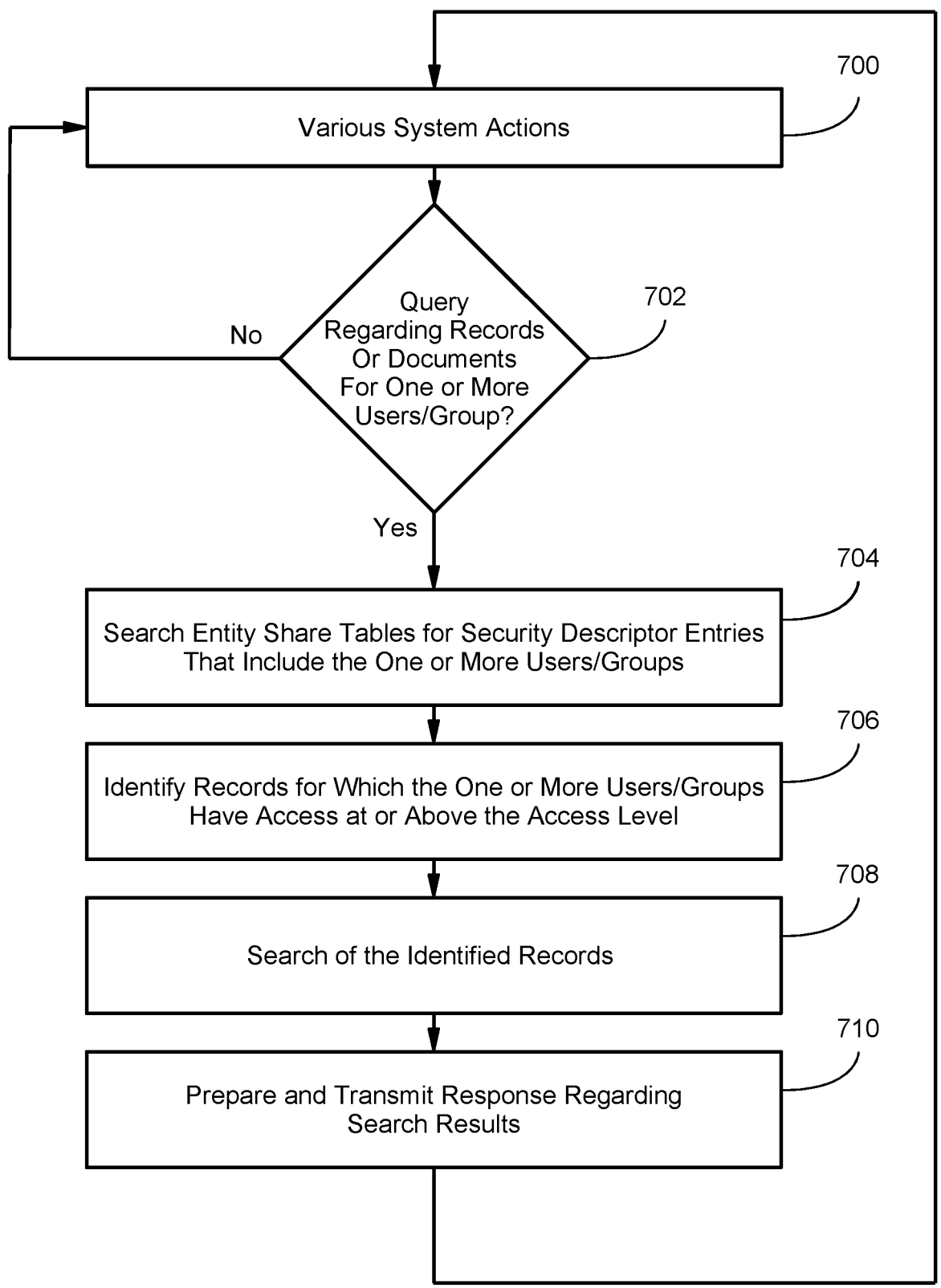
FIG. 7 is a flowchart to illustrate a query process utilizing security descriptors according to an embodiment.

FIG. 7 is a flowchart to illustrate a query process utilizing security descriptors according to an embodiment. In some embodiments, if, among various system actions 700, a query is received regarding records or associated documents for which one or more users, groups, or both have access at a certain access level 702 (such a query from a user system involving a search for an element x in such records), then there is a search of entity share tables for security descriptor entries that include the one or more users, groups, or both with access level at or above the certain access level 704.

Based on the security descriptors, any records to which the one or more users, groups, or both have access at or above the access level are identified 706. If any records are identified, a search is made of the identified records (such as a search for a certain element in the records) 708, and a response is prepared and transmitted regarding the search results 710. In an example:

(a) A system receives a query to access multiple records from a user account for a certain user. In a specific case, an employee (the user) may submit a query for the word "contact" in such records.

(b) The system identifies a first security descriptor associated with the user account in an entity share table, wherein the first security descriptor specifies a first access for the user account to a first group of records. For example, a database system identifies a security descriptor that specifies read, write, and delete access for all records created by the employee.

(c) The system identifies a second security descriptor associated with the user account, wherein the second security descriptor specifies a second access for the user account to a second group of records. For example, the database system identifies a security descriptor that specifies Read Only access for all records sent to the employee by the employee's supervisor. Similarly, the database system may identify other security descriptors that correspond to records in a private online social network group of which the employee is a member, all records in an online social network group, and all records in a library of which the employee is a member. In this simplified example, the system identifies five security descriptors. However, in operation any number of security descriptions may be identified, with the number potentially being much larger.

(d) The system executes the query on the first group of records and the second group of records based on the first security descriptor and the second security descriptor respectively, and continuing with each identified security descriptor. For example, the system executes the query for the word "contact" on the five groups of records identified by the five security descriptors. In contrast, a conventional query may query millions of records for the word "contact," return one hundred thousand records, and then sort through the one hundred thousand records to identify that the employee has read-only access to the ninety thousandth record.

(e) The system returns a response for the query to the user account. For example, the database system identifies which records in the five groups identified by the five security descriptors include the word "contact."

In some embodiments, normalization of sharing rules by using security descriptors allows the database system to use varying execution strategies for asserting sharing rules:

In some embodiments, a database system may index security descriptors to pre-filter search results. For example, in FIG. 6 the generation of a new security descriptor 630 may include indexing of the security descriptor. When an organization has a relatively small number of security descriptors (for example, several hundred or thousands of security descriptors), such as when a number of security descriptors is below a certain threshold, the database system could first obtain a list of security descriptors that contain the name of the current user that has requested access, and then use this subset to filter out records with required user access.

In some embodiments, such as when an organization has a relatively large number of security descriptors (including when a number of security descriptors is above a certain threshold), a database system may check if a security descriptor provides an access to a record, and then cache this result. In some embodiments, the cached result is reused for other records with the same security descriptor. For example, in the illustration shown in FIG. 7, the searching of share tables 704 may include caching of a determination that a security descriptor provides access to a record. Further, such search may include a search of cached results from previous searches. In some embodiments, the cache is scoped to an action execution (for instance, a query). In some embodiments, a cached security descriptor is time based. A solution including caching of results provides benefits when there is high reuse of security descriptors. In some embodiments, one-use security descriptors may not be cached, and a user's access level in a shared security descriptor is cached in such a way to use the shared security descriptors across sessions, connections, and operations.

The examples illustrating the use of technology disclosed herein should not be taken as limiting or preferred. This example sufficiently illustrates the technology disclosed without being overly complicated. It is not intended to illustrate all of the technologies disclosed.

A person having ordinary skill in the art will appreciate that there are many potential applications for one or more implementations of elements of this description, including security descriptor technology, and the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Figure 8:
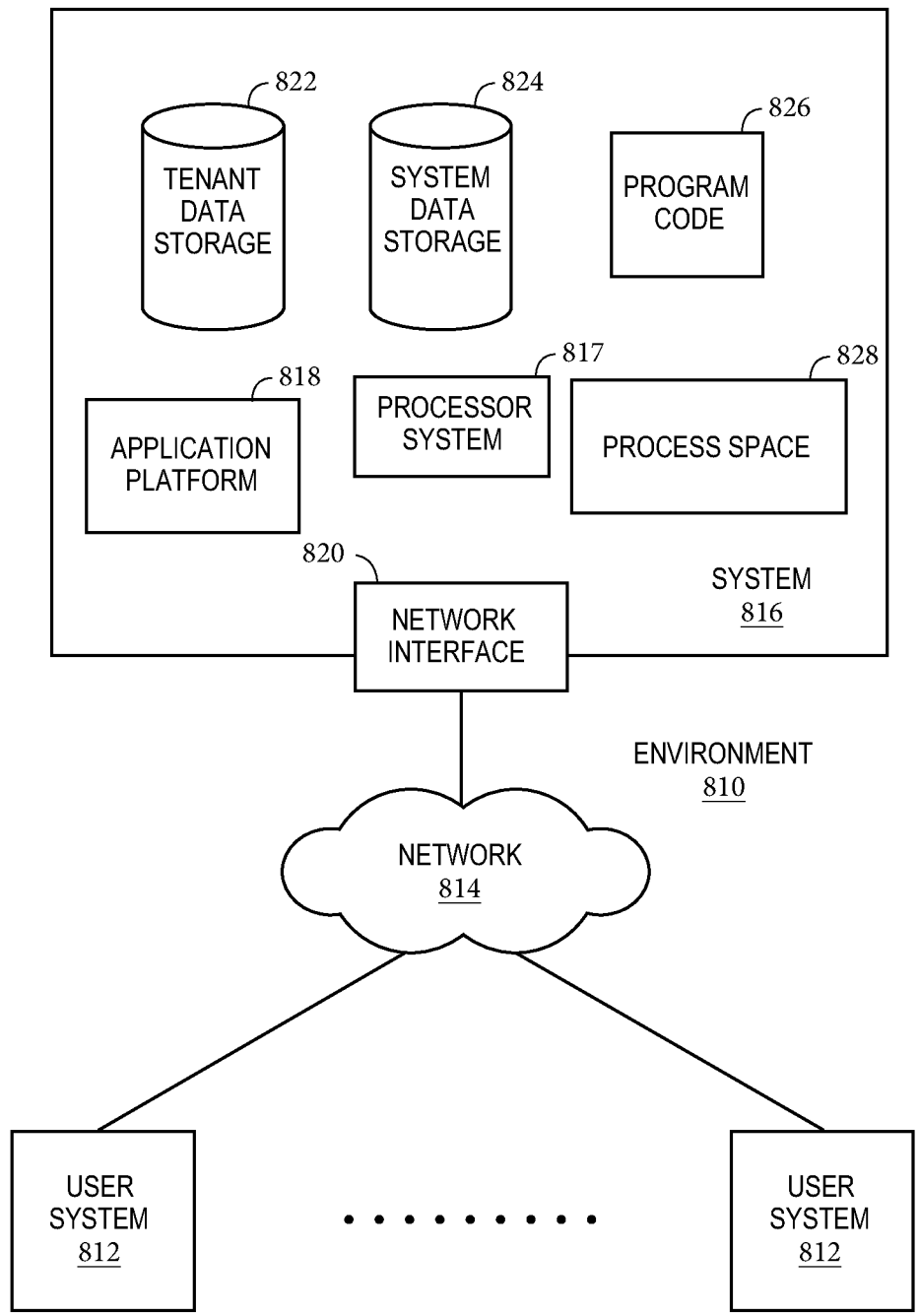
FIG. 8 illustrates a block diagram of an environment wherein security descriptors may be applied according to an embodiment.
Figure 9:
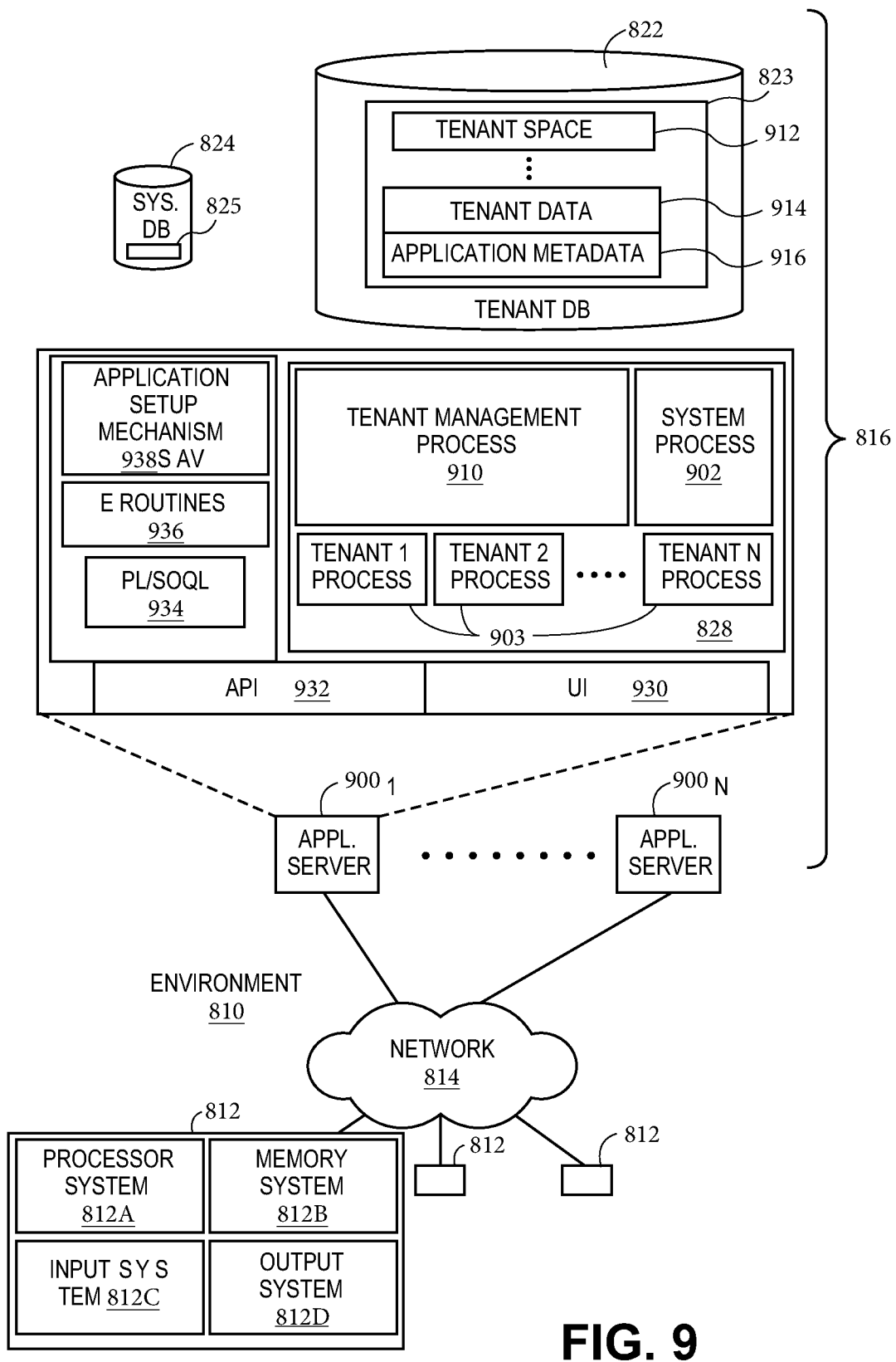
FIG. 9 illustrates details of an environment according to an embodiment.

FIG. 8 illustrates a block diagram of an environment wherein security descriptors may be applied according to an embodiment, and FIG. 9 illustrates details of an environment according to an embodiment. Components within an environment 810 may belong to different layers (e.g., compute, management) and may communicate as described above. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in FIG. 8, and in more detail in FIG. 9, user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein.

A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the Internet, that network will be used in many of the examples herein. However, it should be understood that the networks that are used in one or more implementations may not be so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop or notebook, tablet computer, smart phone, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer, Firefox, Chrome, or a mobile operating system browser in the case of a smart phone, cellular phone, or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen, gesture recognition, or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel processor, including Celeron®, Pentium®, Core®, and Xeon® processors, or the like. Similarly, system 816 (and additional instances of an MTS, where more than one is present) and all of their components might be operator configurable using application(s) including computer code to run using a central processing unit such as processor system 817, which may include an Intel processor or the like, and/or multiple processor units.

A computer program product embodiment includes a machine-readable storage medium (media), including non-transitory computer-readable storage media, having instructions stored thereon/in that can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers 900$_1$-900$_N$, system process space 902, tenant process spaces 904, tenant management process space 910, tenant storage space 912, tenant data 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (illustrated in FIG. 8) implemented as a set of HTTP application servers 900, an application platform 818, tenant data storage 822, and system data storage 824.

Also shown in FIG. 9 is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage spaces 912, which can be either a physical arrangement and/or a logical arrangement of data. Within each tenant storage space 912, tenant data 914 and application metadata 916 might be similarly allocated for each user. For example, a copy of a user's most recently used (MRU) items might be stored to tenant data 914. Similarly, a copy of MRU items for an entire organization that is a tenant might be stored to tenant storage space 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 934 that provides a programming language style interface extension to API 932. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server 900$_1$ might be coupled via the network 814 (e.g., the Internet), another application server 900$_{N-1}$ might be coupled via a direct network link, and another application server 900$_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers. Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described, but can be practiced with modification and alteration within the spirit and scope of the appended claims. The description is thus to be regarded as illustrative instead of limiting.

What is claimed is:

1. A method comprising:
   maintaining, with one or more hardware processing devices, a security descriptor structure storing one or more security descriptors each of which is associated with one or more security descriptor members, wherein each descriptor member comprises at least a record that has been shared with one or more users, groups of users, or both;
   receiving, with the one or more hardware processing devices, a record access query regarding records for one or more users all at a certain access level;
   searching, with the one or more hardware processing devices, the security descriptor structure for security descriptors, each security descriptor being associated with a set of one or more users having access to one or more records of a set of records at the certain access level;
   identifying, with the one or more hardware processing devices, any security descriptors in the security descriptor structure that relate to the one or more users with at least the certain access level; and
   searching, with the one or more hardware processing devices, the one or more records associated with each of the identified security descriptors according to the record access query.

2. The method of claim 1, further comprising reporting results of the search of the one or more records associated with each of the identified security descriptors.

3. The method of claim 1, wherein each unique set of users that have the same access level to at least one record in a set of records are associated with a same security descriptor in a sharing table.

4. The method of claim 1, wherein the searching of one or more sharing tables includes search of one or more of records owned by a user, records that have been shared with the user, records in private groups of which the user is a member, records in public groups, and records in libraries of which the user is a member.

5. The method of claim 1, wherein the search of one or more tables includes searching cached results from a previous search.

6. The method of claim 1, wherein the search of one or more tables includes caching one or more results of the search.

7. The method of claim 1, wherein the computing environment comprises a multi-tenant database environment.

8. A method comprising:
determining, with one or more hardware processing devices, that one or more users are provided access to one or more records at a certain access level in a computing environment;
maintaining, with the one or more hardware processing devices, a security descriptor structure storing one or more security descriptors each of which is associated with one or more security descriptor members, wherein each descriptor member comprises at least a record that has been shared with one or more users, groups of users, or both;
determining, with the one or more hardware processing devices, whether the security descriptor structure in a share table of an entity includes the one or more users at the certain access level;
modifying the entry to include the one or more records with the one or more hardware processing devices if an entry in a share table of an entity includes an existing security descriptor for the one or more users at the certain access level; and
generating, with the one or more hardware processing devices, a new security descriptor and modifying the share table to include the new security descriptor if the share table does not include an existing security descriptor for the one or more users, groups, or both at the certain access level.

9. The method of claim 8, wherein each unique set of users that have the same access level to at least one record in a set of records are associated with a same security descriptor in a sharing table.

10. The method of claim 8, wherein the access level includes one of full access, read-write access, or read only access.

11. The method of claim 8, further comprising indexing the new security descriptor based upon the one or more users.

12. The method of claim 11, wherein indexing includes performing indexing when a number of security descriptors is below a certain threshold.

13. The method of claim 8, wherein the computing environment comprises a multi-tenant database environment.

14. A non-transitory computer-readable storage medium having stored thereon data representing sequences of instructions that, when executed by one or more hardware processing devices, cause the one or more hardware processing devices to perform operations comprising:
maintaining, with the one or more hardware processing devices, a security descriptor structure storing one or more security descriptors each of which is associated with one or more security descriptor members, wherein each descriptor member comprises at least a record that has been shared with one or more users, groups of users, or both;
receiving, with the one or more hardware processing devices, a record access query regarding records for one or more users all at a certain access level;
searching, with the one or more hardware processing devices, the security descriptor structure for security descriptors, each security descriptor being associated with a set of one or more users having access to one or more records of a set of records at the certain access level;
identifying, with the one or more hardware processing devices, any security descriptors in the security descriptor structure that relate to the one or more users with at least the certain access level; and
searching, with the one or more hardware processing devices, the one or more records associated with each of the identified security descriptors according to the record access query.

15. The medium of claim 14, further comprising instructions that, when executed by the processor, cause the processor to perform operations comprising:
reporting results of the search of the one or more records associated with each of the identified security descriptors.

16. The medium of claim 14, wherein each unique set of users that have the same access level to at least one record in a set of records are associated with a same security descriptor in a sharing table.

17. The medium of claim 14, wherein the searching of one or more sharing tables includes search of one or more of records owned by a user, records that have been shared with the user, records in private groups of which the user is a member, records in public groups, and records in libraries of which the user is a member.

18. The medium of claim 14, wherein the search of one or more tables includes searching cached results from a previous search.

19. The medium of claim 14, wherein the search of one or more tables includes caching one or more results of the search.

20. The medium of claim 14, wherein the computing environment comprises a multi-tenant database environment.

21. A non-transitory computer-readable storage medium having stored thereon data representing sequences of instructions that, when executed by a processor, cause the processor to perform operations comprising:
determining, with the one or more hardware processing devices, that one or more users are provided access to one or more records at a certain access level in a computing environment;
determining, with the one or more hardware processing devices, whether an entry in a share table of an entity includes an existing security descriptor in a share table of an entity includes the one or more users at the certain access level;
modifying the entry to include the one or more records, with the one or more hardware processing devices, if an entry in a share table of an entity includes an existing security descriptor for the one or more users, groups, or both at the certain access level; and
generating a new security descriptor and modifying the share table to include the new security descriptor, with the one or more hardware processing devices, if the share table does not include an existing security descriptor for the one or more users, groups, or both at the certain access level.

22. The medium of claim 21, wherein each unique set of users that have the same access level to at least one record in a set of records are associated with a same security descriptor in a sharing table.

23. The medium of claim 21, wherein the access level includes one of full access, read-write access, or read only access.

24. The medium of claim 21, further comprising instructions that, when executed by the processor, cause the processor to perform operations comprising:

indexing the new security descriptor based upon the one or more users.

25. The medium of claim 24, wherein indexing includes performing the indexing when a number of security descriptors is below a certain threshold.

26. The medium of claim 21, wherein the computing environment comprises a multi-tenant database environment.

\* \* \* \* \*